W. A. KIRBY.
Harvester.
No. 1,493. Reissued June 9, 1863.
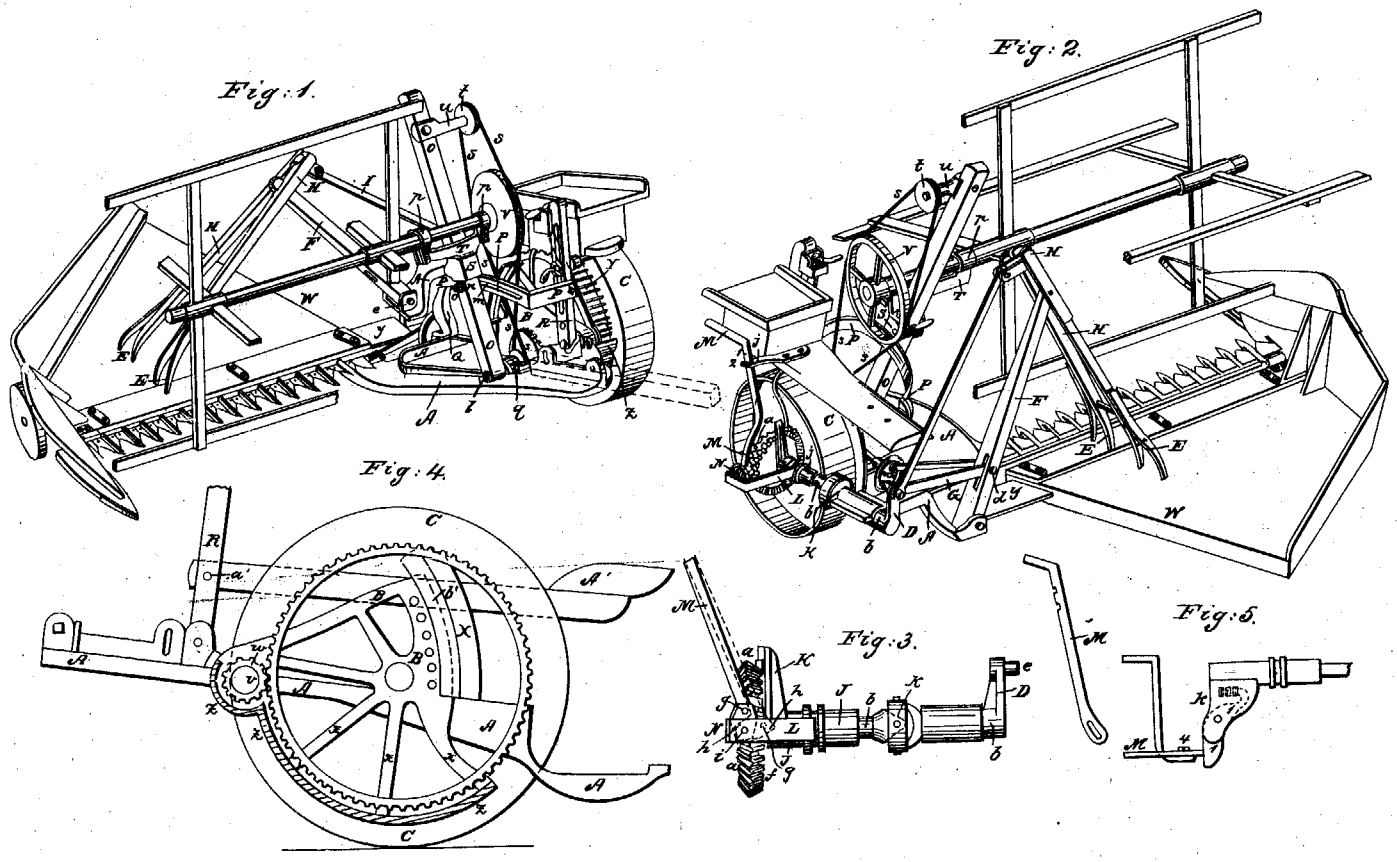
Witnesses:
L. Cohen
Julius Hirsch.
Inventor:
William A. Kirby.
By atty. A.B. Stoughton.
N. PETERS. Photo-Lithographer. Washington. D. C.

UNITED STATES PATENT OFFICE.

WILLIAM A. KIRBY, OF BUFFALO, AND DAVID M. OSBORNE, OF AUBURN, NEW YORK, ASSIGNEES OF SAID WM. A. KIRBY.

IMPROVEMENT IN HARVESTING-MACHINES.

Specification forming part of Letters Patent No. 32,736, dated July 2, 1861; Reissue No. 1,493, dated June 9, 1863.

DIVISION B.

*To all whom it may concern:*

Be it known that WILLIAM A. KIRBY, of Buffalo, in the county of Erie and State of New York, did invent certain new and useful Improvements in Harvesting-Machines and the Raking Apparatus thereof; and we do hereby declare that the following is a full, clear, and exact description thereof, reference being had to the accompanying drawings, making a part of this specification, in which—

Figure 1 represents a perspective view of a harvesting-machine, taken from the front and looking obliquely toward the main frame and the driving-gear. Fig. 2 represents a perspective of the machine, taken from the rear of the main frame and looking toward the outside divider. Fig. 3 represents a view of the rake-gearing detached and on an enlarged scale, to better show its action. Fig. 4 represents a side view of the main frame and main drive-wheel, to show the manner of arranging the shield on the frame to protect the gearing that runs close to the ground. Fig. 5 represents a modification of the device for throwing the rake in and out of gear with the driving-gear of the machine.

The drawings represent a harvesting-machine in detail, many of the details of which have been heretofore patented to the said WILLIAM A. KIRBY, or to him and his associates, and some of which parts are the subject-matter of present applications for patents in connection with this application. It is not therefore deemed necessary to a full understanding of that part of the invention claimed in this application, especially as the whole machine is clearly shown in the drawings.

In harvesting-machines where the cutting apparatus and platform are set up or down to cut at various heights, or where the cutting apparatus and platform rise and fall in accommodating themselves to the inequalities of the ground, and the relative positions of the wheel and platform are changed, and where a rake is used for delivering the cut grain from the platform, said rake being worked automatically, it is necessary that the rake should rise and fall with the platform, so as to preserve a uniform relative working position therewith. When the automatic rake is driven from the main supporting or carrying wheel, which wheel always maintains a uniform height above the ground, it is necessary to make provision for the adjustment of the rake, so that it or its gear shall not cramp or bind when the rake is raised or lowered or the positions of the wheel and platform are changed.

To accomplish this end is the object and purpose of this part of the invention; and it consists in making a universal joint between the driving-gear and the rake, so that as the platform is raised or lowered the rake may conform to it and keep itself adjusted to the platform, and without causing its gear to bind or cramp.

To enable others skilled in the art to make and use this part of the invention, we will describe the same with reference to the drawings.

A represents a main frame, to which the finger-bar 5, cutting apparatus 6, platform 7, reel 8, and a portion of the driving-gear 9 are connected; and B is a supplementary or segmental frame pivoted to the main frame, this frame B having the main driving and supporting wheel C, as well as the driver's seat and some of the gearing, connected with it. There is attached to the main wheel a bevel-pinion that turns with the drive-wheel. This pinion gears into and turns a bevel-gear, *a*, on one end of a shaft, *b*, the other end of said shaft having a crank, D, upon it for operating the rake E, as follows: A rake-post, F, is hinged at *c* to a projecting portion of the main frame A, the hinge-joint being so arranged as that said rake-post may swing toward and from the grain side of the platform. A connecting rod or bar, G, is pivoted to the rake-post F at the point *d*, and its other end is pivoted to the wrist-pin *e* of the crank D, so that this crank and connecting-rod define the swinging motion of said rake-post—that is to say, its extent of motion. To the top of the rake-post is pivoted the shank or handle H of the rake or fork E, this shank extending beyond its pivoted point, and at or near its end having a pitman, I, connected with it, which pitman also extends to and is connected with the wrist-pin *e* of the crank D, so that the crank D gives a compound motion to the rake by swinging the rake-post toward and from the outside divider or fence by means of the pitman G, and causing it to rise and fall, and then be drawn back over the platform mainly by the pitman I, but partially by the pitman G.

The platform and cutting apparatus must be raised and lowered to cut at a suitable height, and the rake must consequently be raised and lowered with it. Now, the rake as above described is arranged on the main frame A and platform, while it is driven from the main wheel C, which is on the supplementary frame B, and these two frames and platform have or may have different elevations above the ground at different times; and without suitable provision for the purpose the rake and its gear would so bind and cramp as to stop, cut, or break. To compensate for this contingency a universal joint, *k*, is provided in the rake-shaft *b*, which allows the two frames all their requisite play or adjustment and leaves the rake free to accommodate itself to the platform at any of its positions without cramping or binding its gear.

Having thus fully described the nature and object of this part of the said KIRBY'S invention, what is claimed under this patent is—

In combination with a rake-post on the main frame, and the rake-driving shaft supported at one of its ends on a supplemental frame, the two frames having motions independent of each other, the universal joint *k* in the rake-shaft, for the purpose and in the manner substantially as described.

WM. A. KIRBY.
D. M. OSBORNE.

Witnesses:
J. H. OSBORNE,
H. N. LESTER.